United States Patent [19]
Lyman

[11] 3,775,238
[45] Nov. 27, 1973

[54] STRUCTURAL COMPOSITE MATERIAL
[76] Inventor: John W. Lyman, 1730 Kettner Blvd., San Diego, Calif. 92101
[22] Filed: June 24, 1971
[21] Appl. No.: 156,369

[52] U.S. Cl............... 161/123, 156/180, 156/242, 161/57, 161/139
[51] Int. Cl............................................. B32b 3/00
[58] Field of Search..........................161/57–59, 122, 127, 139; 156/180

[56] References Cited
UNITED STATES PATENTS

| | | | |
|---|---|---|---|
| 3,273,833 | 9/1966 | Windecher.................... | 161/DIG. 4 |
| 2,715,598 | 8/1955 | Rees et al........................... | 161/122 |
| 2,593,714 | 4/1952 | Robinson............................ | 161/139 |
| 3,589,972 | 6/1971 | Greig et al.......................... | 161/127 |
| 3,331,173 | 7/1967 | Elsner.............................. | 161/DIG. 4 |
| 2,503,450 | 4/1950 | Nebesar.......................... | 161/DIG. 4 |
| 3,449,482 | 6/1969 | Mitchell et al...................... | 161/122 |

Primary Examiner—George F. Lesmes
Assistant Examiner—James J. Bell
Attorney—Roger A. Marrs

[57] ABSTRACT

A reinforced composite structure consisting of a pair of matching halves is disclosed herein wherein each half includes reinforcing members arranged in a predetermined geometry, consistancy and quality forming a structural matrix. The composite material is designed to meet analytical requirements and to satisfy the loading conditions to which it is subjected. The composite material can be applied to sandwiched cores, structural profiles or shell structures, for example. Fastening and other securing devices secure the structure halves together in addition to adhesives and also provide a means for transferring load forces from the composite material to load absorption connecting structures.

7 Claims, 17 Drawing Figures

PATENTED NOV 27 1973
3,775,238
SHEET 1 OF 3
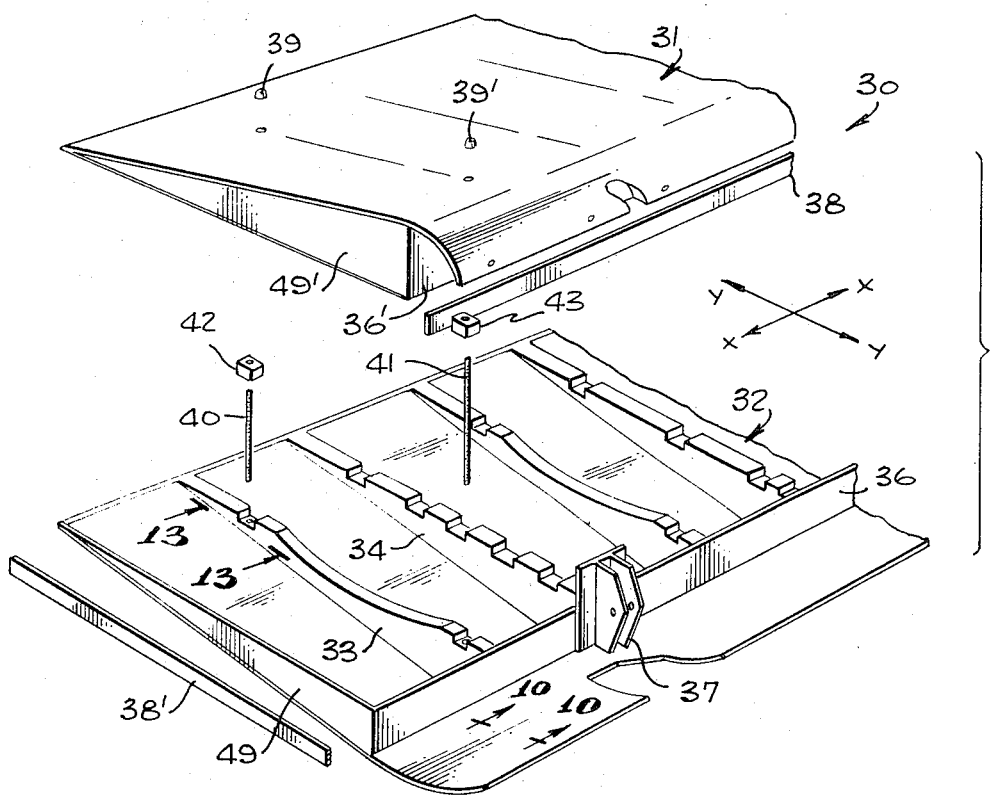
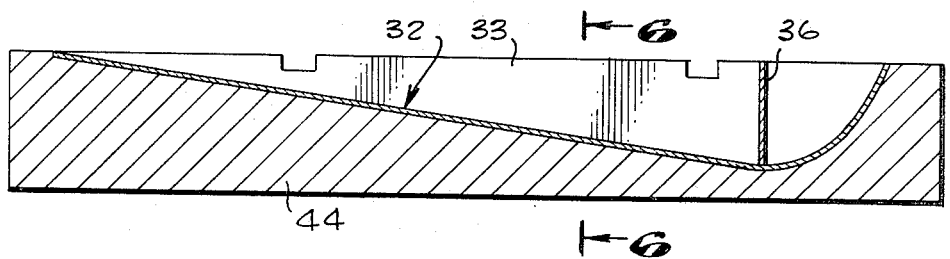
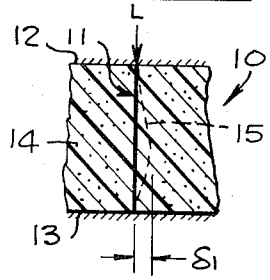
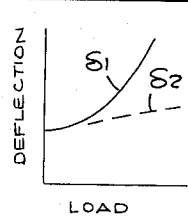
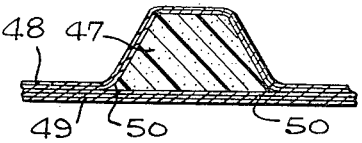
INVENTOR.
JOHN W. LYMAN
BY
Roger G. Marrs

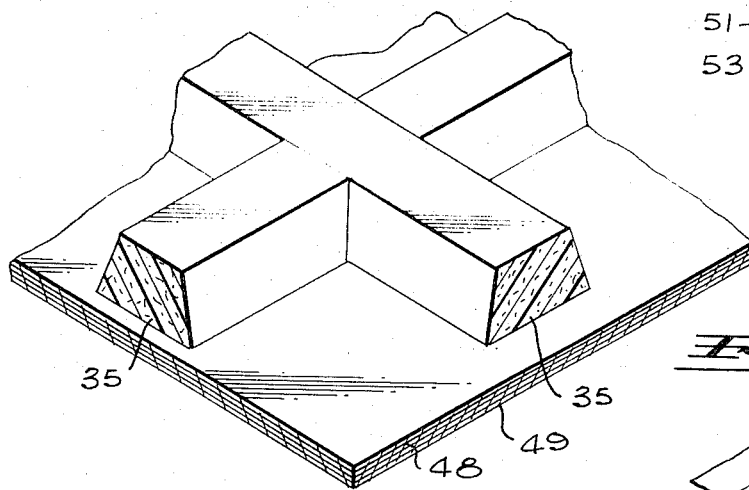
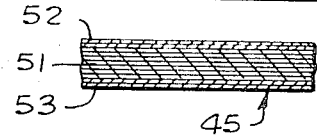
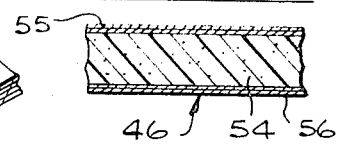
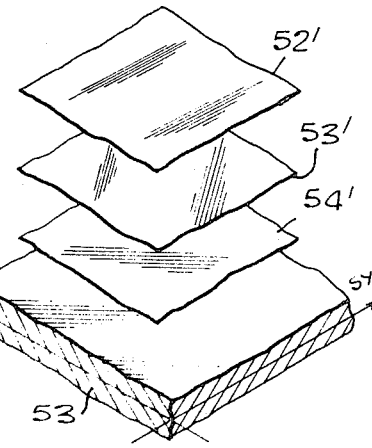
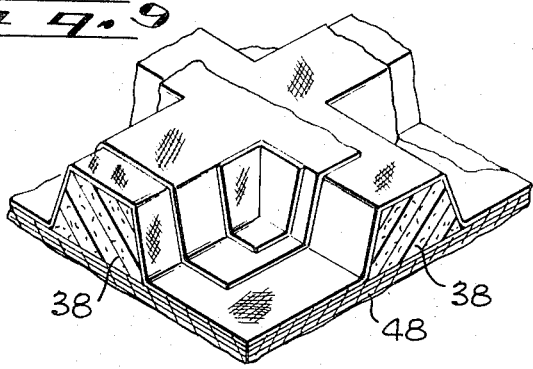
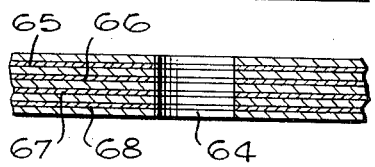
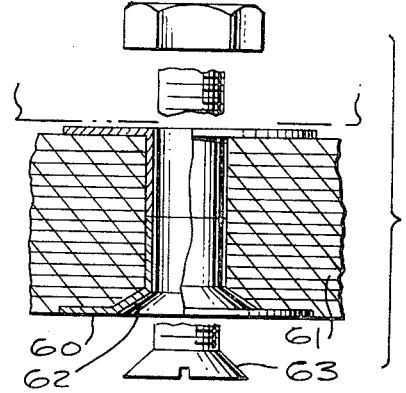
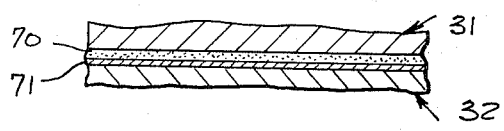

INVENTOR.
JOHN W. LYMAN
BY Roger A. Marrs

STRUCTURAL COMPOSITE MATERIAL

BACKGROUND OF THE INVENTION

1. Field of the Invention

This invention relates to articles or structures of reinforced composites and to the manufacture thereof and, more particularly, to such articles or structures in which the physical and mechanical properties of the composite materials are selectively controlled to meet predetermined design properties. Such properties as strength, stiffness and energy absorption can be selected by the choice of material composition and material geometry.

2. Description of the Prior Art

In many industries, it is desirable to provide an article or panel structure having a high strength-to-weight ratio. It is known that low density materials can be obtained by the addition of foaming agents thereto so that cellular materials are created with various densities. For obtaining desirable physical characteristics, foam material of various synthetic resins such as various vinyl derivatives and other polymers such as polyesters and polyurethane vinyl derived from isocyanate may be employed, and syntactic foams. All of these materials may be generally termed "plastic foam." Such materials are basically isotropic and do not always have the requisite physical properties in resistance to loads applied in various predetermined directions for a variety of applications.

In composite materials, two or more materials are combined in an ordered manner to give a single material having properties superior to the individual starting materials. In most cases, composites consist of high strength fibers embedded in a matrix of another substance, although other reinforcement configurations may also be used. Fiber reinforced composites are of particular interest since it has long been known that materials achieve their highest strength in fibrous form. The molecules or atoms of fibrous materials are oriented by the processes involved in their preparation to produce extremely high strength in the axial direction. This property of high strength in a single direction provides the manufacturer of a composite material with the freedom to orient the fibers in the best direction to sustain the load imposed upon it. The strength of the fibers may thus be utilized to the full advantage. In describing a composite material, therefore, it is necessary to specify not only the type of fibers and matrix and their relative proportion, but also the orientation of the fibers.

Matrices have been reinforced by various methods (so as to accommodate applied stresses) which take the form of random oriented fibers, woven mesh, oriented fibers in three dimensions, and reinforcement by rigid core members of various configurations. Such reinforcements strengthen the matrix to suit the particular application to which the specific combination of reinforcement means relate. However, these same attempts to provide reinforcement, and yet maintain a high strength-to-weight ratio are not adaptable to provide physical properties that are required for other usages of the particular application. In other words, all known reinforced composite panels or structures presently employed are directed towards relatively narrow and specific structural applications and are grossly unsuited for other applications wherein different stresses under varying load conditions are encountered.

One attempt to provide a structural panel or block which is reinforced by means of the incorporation of fibers arranged in an orderly pattern is disclosed in U.S. Pat. No. 3,322,868, wherein a block is described having threads or strands oriented evenly, in parallel, as well as extending perpendicular to each other in three planes, respectively. Although such a three-dimensional reinforced structure may be suitable for the specific application disclosed, other applications are encountered which are different from the particular application mentioned above wherein the reinforcements should be oriented at angles other than 90° with respect to each other and perhaps reinforced in one or two dimensions rather than three. Furthermore, such a prior attempt does not take into account any provisions for including load bearing stiffeners or rigid core members as part of the structure which members may be critically located with respect to the planes of fibers embedded in the surrounding material so that the panel or block may be additionally strengthened without a substantial increase in weight.

Other prior art U.S. Letters Patents which suffer from some of the disadvantages mentioned above are set forth in U.S. Pat. Nos. 2,994,327; 2,999,041; and 3,310,300. All of the prior art devices encounter other problems dealing with attachment of the blocks or panels to supporting construction such that the panel will ultimately bear loads or transmit the loads into the supporting construction. Even though fiber networks and woven mesh are employed to rigidize the cellular foam materials, no attempt has been made to utilize this construction in an edge or central attachment system whereby the panel or block may be mounted on supporting construction so as to take advantage of the improved characteristics of the panel or block.

SUMMARY OF THE INVENTION

Accordingly, the present invention provides improvements in fibrous composite materials consisting of two or more segments forming the total geometric shape including matrices reinforced with load carrying elements to create unique physical and mechanical properties. Applied loads are transmitted to the combined composite segments through edge attachment or fastener systems and the physical and mechanical properties can be made to satisfy predetermined stress and stiffness requirements through the selection of the matrix material, the material of the reinforcing elements and of the reinforcing element geometry. The invention provides for a composite material with unique properties designed to meet the preselected physical and mechanical requirements of any specific application. Such properties are obtained through composite engineering, by analysis, matrix selection and reinforcement selection as well as selection of goemetry of the composite materials. Furthermore, the invention provides methods for the transfer of loads to other structural members through predetermined attachments utilizing the improved properties of the composite. The unique advantages of reinforced composites lie in the characteristics of the reinforcing elements suspended in the matrix. These elements are the prime load carrying components of the composite. By the selection of materials and of reinforcement geometry, structural efficiency can be obtained to meet the theoretical load distribution.

In one form of the invention, a structural panel is provided by mating matching half panel sections together having opposite opposing face areas which combine to provide a reinforcing material built-up in place employing a fiber network system of a perdetermined geometry. Distributed between the panel section face areas, there is provided a plurality of load bearing rigid core members so that each core member reinforces the composite material of the panel sections. In essence, a variety of loads, such as compressive, tension or shear, may be applied to the panel surfaces which are resisted by the reinforced matrix that may comprise the fiber network system, solid core members of varying shape, a metal strand or mesh network or any combination thereof, as well as the employment of cellular material so that optimum load carrying ability is achieved.

Compression loading is exemplary of load handling capability in which reinforced composites of the present invention resist the tendency to distort or to buckle due to instability at some point along its load bearing versus deflective curve. The combination of both balanced or unbalanced fiber network systems in combination with fiber orientation makes it possible to design a shock absorbing panel where the reinforcement absorbs the initial energy before transferring the load to the matrix.

Therefore, it is among the primary objects of the primary invention to provide a novel reinforced fibrous composite having a reinforcing network system of a preselected geometry embedded in surrounding binder material so that the resultant composite has an improved strength-to-weight ratio adapted to accommodate a variety of applied loads.

Another object of the present invention is to provide an improved reinforced fibrous composite which may take the form of a structural configuration such as a panel, tube or beam having a preselected matrix or system formed from a continuous or discontinuous metallic or non-metallic strand, roving, mesh or the like, arranged in a preselected network geometry embedded in a binder material wherein the preselected geometry determines the optimum strength of the composite.

Still another object of the present invention is to provide a novel multi-directional reinforced structure such as a panel or tube having a network of fibers embedded in a coherent material wherein an additional combination of fibers and material serve as reinforced load bearing stiffeners or rigid core members which are critically located throughout the structure.

A further object of the present invention is to provide a structural material strengthened by a network of fibers and substructure arranged in a balanced or unbalanced multi-directional network.

Yet another object of the present invention is to provide a novel composite material consisting of a matrix reinforced with load carrying elements to create unique physical and mechanical properties and further including attachment means for transmitting loads to and from supporting structure.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a sectional view of a conventional panel having a load carrying member or stiffener surrounded by a matrix material;

FIG. 2 is a sectional view of the composite structure of the present invention incorporating a fiber network in an adhesive, bonding or fusing material matrix for supporting a reinforcing load carrying member;

FIG. 3 is a diagrammatic drawing comparing the deflection of the reinforcing member employed in the panel and inventive composite, respectively, as shown in FIGS. 1 and 2;

FIG. 4 is an exploded perspective view of a pair of matching panel sections preparatory to securement together providing a load bearing panel forming a structure from a fibrous composite material;

FIG. 5 is a transverse sectional view of a typical mold or form employed to fabricate a panel section as used in the panel shown in FIG. 4;

FIG. 6 is an enlarged cross-sectional view of a panel section incorporating a typical integral reinforcing member as taken in the direction of arrows 6—6 of FIG. 5;

FIG. 7 is an enlarged fragmentary sectional view of an unreinforced portion of the panel;

FIG. 8 is a perspective view of another reinforcement member configuration showing a mandrel in position during fabrication intended to be covered;

FIG. 9 is a view similar to the view of FIG. 8 illustrating several layers of impregnated fiber woven material mounted on the mandrel;

FIG. 10 is an enlarged view of a panel illustrating opposite face sheets separated by a syntactic core as taken in the direction of arrows 10—10 of FIG. 4;

FIG. 11 is an exploded view, in perspective, of a lay-up pattern of fibrous tape employed as reinforcing for the panel illustrating selective fiber orientation;

FIG. 12 is an enlarged sectional view of an attachment device for securing a panel to adjacent supporting structure;

FIG. 13 is an enlarged sectional view of a portion of panel section construction adapted to receive a securement fastener as taken in the direction of arrows 13—13 of FIG. 4;

FIG. 14 is an enlarged view of the interface between mating panel sections;

DESCRIPTION OF THE PREFERRED EMBODIMENTS

Figure 15:
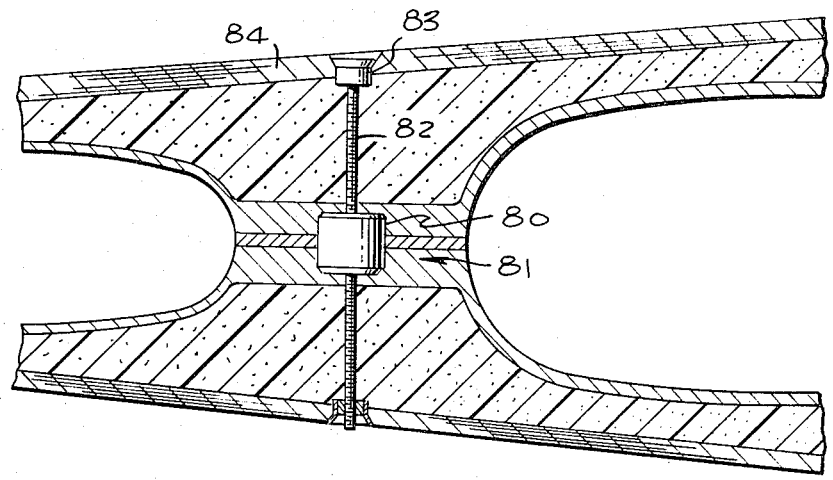
FIG. 15 is a sectional view of a panel having a pair of sections joined together and held by a bolt in which a shear block is incorporated.

Before discussing the detailed embodiments of the invention, the following is a general discussion which will be helpful in understanding and clarifying the inventive constructions to be described.

Low density materials, such as plastic foams or the like, are generally known for their relatively low mechanical properties which limits their use for structural application. While the properties of a plastic composition can be varied with a change in density, the choice of properties is tightly constrained. The addition of reinforcing elements in combination with different matrices will greatly increase the choice of design properties. For modular tension, the strength of the composite will be greatly influenced by the reinforcing members. Since these may be of an order of magnitude stronger and stiffer than the matrix, the strength will be proportional to the amount of reinforcement in the composite. The modulus of elasticity of the composite is determined by the precentage of reinforcement and by the modulus of elasticity of each of the materials.

The compression strength of the composite is also greatly improved by the addition of reinforcement. When a reinforced fibrous composite is subjected to compression forces, the load carried by the members oriented in the direction of loading is determined by the relative proportion of combined matrix reinforcement as well as the compressive moduli of elasticity of these materials. When the reinforcing members are short stable columns, they generally fail when the material yield point has been reached and exceeded. When the reinforcing elements are slender columns, each column will fail due to structural instability. The role of the matrix, taking the form of the plastic composition, is that of stabilizing these fibrous columns. This is particularly important where the reinforcement consists of relatively small diameter fibers. The ability of these fibers to carry compressive loads is greatly influenced by the strength and toughness of the matrix material.

The unique advantage of reinforced composites is the ability to orient and balance the selection of combined reinforcement materials to suit the particular design requirements. The conventional uni-directional composites are the most efficient, but only suited for special loading conditions. The use of bi-directional and multi-directional composites are better suited for most applications which are loaded in more than one axis.

In an application where the foam is used as the core in a sandwiched structure, the reinforcement may be oriented at an angle to the face sheet to improve shear strength as well as shear modulus. Because the shear load in such a composite core is carried by the reinforcement, the strength and stiffness is reflected in the choice of reinforcement materials. The shear fatigue life will also be influenced by the reduced shear load carried in the foam matrix and by the reduced strain to which it is subjected. The reinforcement of the composite may consist of fibers, strands or wires woven into a multi-directional structure. The primary load carrying elements are designed to absorb the applied loads. The matrix contributes to structural efficiency by supporting the reinforcement and the maintenance of shape. The matrix also contributes to the protection of the reinforcement from degrading environments and to form a solid composite shell.

Referring to FIG. 1, a conventional composite panel is indicated in the direction of arrow 10 having a stiffener member 11 placed perpendicular between parallel opposite external surfaces 12 and 13 of a filler material 14. The filler material may be represented by a polystyrene or polyurethane foam and the stiffener or core member 11 may be composed of metal or other high strength material intended to be load bearing. In this prior art construction, when a compressive load, as an example of applied stress, is placed against the surfaces 12 and 13 of the block, the stiffener 11 will buckle into the stressed configuration shown by broken line 15 as the load pressure is applied in excess of the material yield point of the stiffener 11. Inasmuch as the foam composition 14 serves only a filler purpose, very little if any support or reinforcement is provided for the stiffener 11 which would repel the buckling of the stiffener as the compressive load pressure is applied. The total deflection of the stiffener 11 for a given compressive load force may be said to be represented by $Delta_1$.

Referring now to FIG. 2, a composite panel incorporating the present invention is illustrated in the direction of arrow 16 wherein a matrix material 17 is provided having a fiber network embedded therein as indicated by numeral 18. The fiber network 18 is so arranged as to stabilize the matrix so that a load bearing stiffener 19 will be adequately reinforced upon the application of a compressive load to opposite facing surfaces 20 and 21 of the matrix material. The degree of support for the reinforcement stiffener 11 can be controlled by variation in control of the matrix. The fiber network is arranged in a predetermined two-dimensional geometry with respect to the stiffener 19 and, in combination with the matrix 17, serves to stabilize the stiffener 19 when the compressive load is applied so that the amount of deflection under the same load applied with respect to the conventional panel 10 amounts to no more than is indicated by $Delta_2$ and as indicated by the broken line 22. Therefore, it can be seen that the fiber network embedded in the matrix serves to reinforce the stiffener 19 and is not simply employed as a filler composition as is the case with the conventional block 10.

FIG. 3 graphically illustrates the amount of deflection (Delta) for the stiffeners 11 and 19, respectively. Under compressive loading conditions applied to the opposite ends of the stiffeners, it can be seen that the amount of deflection for the stiffener 19 as represented by $Delta_2$ is substantially constant with little, if any, increase in lateral displacement. However, the lateral displacement of stiffener 11 as represented by $Delta_1$ is substantial and rises according to an exponential curve as the compressive load increases.

Referring now in detail to FIG. 4, an embodiment of the unique integral structural configuration is illustrated in the general direction of arrow 30 which comprises a wing aileron as an example. The panel 30 consists of two mated panel sections represented by numerals 31 and 32 which are independently fabricated and which are separated at the neutral axis or centerline in plane of the total geometric shape. Each panel section 31 and 32 is a stiffened member by means of various core members forming frames, spars, beams or the like. For example, transverse frames indicated by numerals 33 and 34 are indicated by transverse axis Y—Y and are normal to the longitudinal axis indicated by X—X, and spars, longerons, or beams are parallel to the longitudinal axis and such a reinforcing member is identified by numeral 36.

Suitable attachment or fittings, such as identified by numeral 37 may be suitably secured to the reinforcing core members by any suitable means, such as bonding, bolting or other joining techniques. A doubler 38 may be employed for joining beams 36 and 36' of the panel sections 31 and 32 so as to readily accept the mounting of shear fasteners as would be the ordinary practice in airframe manufacturing. Doubler 38' joins ribs 49 and 49'. Fastening devices such as threaded rods 40 and 41 are disposed between the mated panel sections 31 and 32 and arranged so that their threaded opposite ends pass through shear blocks 42 and 43, held in receptacles in the frames. The threaded rods 40 and 41 are then secured by nuts 39 and 39'.

Each panel section or structured half is initially molded and secured in a cavity mold indicated by numeral 44 indicated in FIG. 5. Fibrous composite material, such as a woven mesh impregnated with a suitable resin, is initially placed into the cavity of the mold so as to conform with the configuration thereof. The composite material is displaced in the mold cavity so as to agree with the dictates of the analysis and the composite material is placed in layers or outer plies against the mold. This material forms the panel sections or shell and may take the form of a solid laminate, as shown in FIG. 7 indicated by numeral 45, or a sandwich construction, indicated by numeral 46 in FIG. 10. FIG. 11 shows layers or plies of fibrous composite material 52'-54' laid next to each other in a predetermined orientation of fibers. As shown, the length of the fibers are crossed at angles from one layer to the next.

In the event that a stiffening or cap material is required for the transverse frames, longitudinal means or other stiffening members, this material is disposed on the panel outer skin or shell according to the analysis. Material is placed on the inner surface of the shell or panel and built up according to the desired characteristics of loads to be carried. Accordingly, mandrels, such as indicated by numeral 47 in FIG. 6, are placed on the stiffening skin or shell within the mold. The mandrels are cut to match the cross section inner surface of the transverse frames, longitudinal beams, or other stiffening members. The mandrels are shaped to be undersized so that a liquid shim material may be used to effect the matching of one panel section with the opposite panel section of the structured configuration. This is done to eliminate the need to machine the faying surfaces of the two panel section halves.

The mandrel 47 may take the form of a cellular foam composition, precured laminate, honeycomb, wood or synthetic, or a suitable syntactic material may be employed, as examples. The outer shell of the panel section is indicated by numeral 48 wherein fibrous woven material is placed on top of the inner skin indicated by numeral 49, which may be composed of graphite, for example. The mandrel 47 is laid upon the layers of cloth and additional layers are covered over the mandrel. This procedure is shown in FIGS. 8 and 9 wherein a crossed mandrel 35 is covered with a plurality of cloth layers at critical locations. The transverse frame, longitudinal beam and/or other stiffening member is formed by laying composite material over the mandrels oriented to satisfy the analysis requirement. That portion of this composite material which is secured to the shell or panel indicated by numeral 48, is tapered in thickness to avoid abrupt changes in section and, therefore, stress concentration in the shell or panel section. Such a taper is indicated by numeral 50 in FIG. 6.

As indicated in FIG. 7, the outer panel or shell may take the form of a syntactic core 51 sandwiched between an inner plurality of fiber material layers 52 and an outer lay-up of layers 53. In contrast, the panel 46 in FIG. 10 comprises a central cellular foam core 54 secured at its interface to the inner and outer layers identified by numerals 55 and 56.

Mechanical fasteners are employed to secure the two panel sections or halves of the structured configuration together. Threaded rods 40 and 41 may be employed in connection with the shear blocks 42 and 43. The resulting effect is a side bearing load applied by the mechanical fastener to the composite material. If the side bearing load exceeds the bearing allowable of the composite material at the interface with the mechanical fastener 39 and 39', a large diameter flanged bushing can be installed in the composite material during fabrication. A large diameter flanged bushing is shown in FIG. 12 and is of a compatible high bearing strength material. Any bearing load transmitted to the bushing will be transfered to the skin of the panel through a bonded surface between the large diameter flange and the skin surface of the component element. As the bearing load increases, the flange diameter must increase up to practical limits to effect successful load transfer. FIG. 12 illustrates a provision of a flanged metal bushing or sleeve 60 retained in a hole passing through a plurality of layers of composite material. The layers are collectively identified by numeral 61 and it can be seen that one end of the sleeve 60 is countersunk, as represented by numeral 62, so as to receive a countersunk head 63 of a fastener.

For bearing loads beyond the practical limit of the large diameter flanged bushing or sleeve, metal shim stock may be laminated between the lamina to the required area to carry the increased bearing load. Such a relationship is shown in FIG. 13 wherein a hole 64 is provided through the composite material and metal shim lamina. The plurality of metal shims are indicated by numerals 65, 66, 67 and 68 respectively. The face area of the bearing material must be sufficient to transfer the bearing load to the skins via interlamina shear between the lamina and the bearing material.

The two panel section halves of the structural component must mate to insure external geometric dimensions and internal structural integrity. This may be readily accomplished by producing faying or mating surfaces undersized, up to 0.13 inches for example. A thickened structure adhesive is then applied to one mating surface so as to insure an excess of material and the adhesive is identified as numeral 70 in FIG. 14 as being carried by one panel section 31. A parting film 71 is then applied to separate the mating half of the structural component 32 to insure that the thickened structure adhesive will not adhere to the mating part 32. The two panel section halves are now aligned in the finished relationship locating from basic surfaces. As the two panel section halves mate, the excess thickened structural adhesive will extrude from the joint. The two panel section halves are then separated and the thickened structural adhesive is cured after removing the excess. The parting film is removed from the mating half. The result is a perfectly matched joint without the necessity of machining.

The two panel section halves of the structural component may be bonded together or, if inspection is required, and access is limited, a system of mechanical fasteners may be employed as shown in FIGS. 4, 12 and 15. Preferably, shear fasteners are used through the doubler 38 and webs of the transverse closing frames and longitudinal beams 49, 49', 49'' and 36 respectively. Preferably, double countersunk rivets are used along the trailing edge members.

The chordwise bending loads are carried by tension fasteners 40 and 41 and shear blocks 42 and 43 and similar fasteners installed throughout the length of the panel 30. These fasteners may be threaded rods with countersunk, spherical lock nuts bearing upon the previously mentioned large diameter flanged bushings. The tension rods extend from one surface to the opposite surface of the panel sections with the above described lock nut at each end of the tension bolt.

Prior to installing the tension bolt, both panel sections are drilled simultaneously locating from drill fixtures so that the holes are in proper alignment. A spherical countersink is made in the surface of each half outer shell. The undrilled large diameter flanged bushing is bonded in place in each panel section half with a thickened structure adhesive. The tension bolt hole is then drilled from one side to the other through the bushing, panel, mandrel, inner flanged bushing, opposed mandrel, panel and bushing.

If the panel or shell is a sandwich, as shown in FIG. 7, a unique core material can be used to insure co-curing (simultaneous curing of the entire lay-up) during the manufacturing process. This core material is a syntactic material suspended in a modified resin system, that can be designed to match the specific load requirements, which is then stabilized in a loosely woven cloth to preclude any extrusion of the material due to the cure cycle pressure.

This core material provides a low density core that can be applied as a cloth and cured simultaneously with the remainder of the component. This core material provides superior properties as compared with other core materials. It is practical therefore to utilize this material in the rule of mixtures concept to design component material to match the load. The subsequent co-curing can then be accomplished as this core material can support the face sheet material during the heat and pressure required to obtain a cure. This core material also provides a very durable, tough surface as compared with existing low density materials.

The composite materials provide a wide range of specific properties. These materials consist of a compatible resin system matrix impregnated into cloth or unidirectional tapes which consist of fibrous materials of various properties. The materials consist of the various glass, fiber, graphite and carbon fibers and the syntactic core materials. By utilizing the properties of these materials in discreet orientations, volume and thicknesses, material can be designed to match a given load condition. All of these materials have compatible handling characteristics and can be readily applied to mold surfaces and cured simultaneously utilizing a common cure cycle and post cure.

The purpose of co-curing a component is to reduce cost and increase reliability. This is done by installing all of the material in a mold to produce an integral structure component and subjecting this material to a cure cycle and post cure cycle. In this manner, materials are formed, strengthened, located and secured in the structure in one operation. The combination of materials, process, and structure configuration previously discussed are required to make the co-curing feature feasible.

Figure 16:
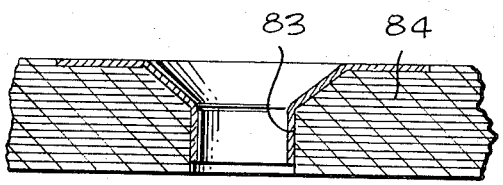
FIG. 16 is an enlarged sectional view of the panel edge reinforcement region having a countersink sleeve for receiving the bolt fastener shown in FIG. 15.

FIG. 15 illustrates that the present invention may provide for installing a shear block 80 mounted in a counter bored hole in the laminate. At this juncture, the laminate provides a bearing material as identified in the general area of numeral 81. A threaded tension rod 82 extends through the bearing material and the shear block. Bearing strength is provided at the exterior surfaces of the structure by employing a large diameter flanged bushing or sleeve, such as bushing 83 shown in FIG. 16.

The bushing is bonded with adhesive within a hole in the laminate which is indicated by numeral 84. The bushing 83 includes a cylindrical shank terminating at one end in a countersunk flared portion that merges with an annular flange.

To verify the expectation of cost and weight saving and, therefore, improved cost effectiveness of the disclosed concept versus existing structures state of the art, an analysis was performed. The analysis assumed that both structures were subjectd to the same strength and stiffness requirements and were of the same external geometry. An existing aluminum aileron was compared with an integral structure advanced composite material aileron. The results are listed below.

|  | Existing Concept | Disclosed Concept |
|---|---|---|
| Strength & Stiffness (equal) | 1.0 | 1.0 |
| Weight-% Decreased Weight | 150.7 lb. | 114.34 lb. −24.1 % |
| Cost ($/lb): | | |
| No. 1 unit | $640/lb. | $570/lb. |
| No. 5 unit | 255/lb. | 235/lb. |
| No. 100 unit | 61/lb. | 47/lb. |
| No. 500 unit | 31/lb. | 23/lb. |
| Cost/unit: | | |
| No. 1 | $964.00 | $651.00 |
| No. 5 | 384.00 | 269.00 |
| No. 100 | 92.00 | 53.70 |
| No. 500 | 46.70 | 26.25 |
| % Decrease in Cost: | | |
| No. 1 unit | — | −32.5% |
| No. 5 unit | — | −29.9% |
| No. 100 unit | — | −41.7% |
| No. 500 unit | — | −43.8% |

Cost effectiveness is defined as the strength and stiffness divided by the total component weight divided by the procurement cost plus the operational cost. In the present instance, the operational cost is similar to glass fiber composites which is less than existing metallic structures. However, we will ignore operation cost for this comparison. Therefore, procurement cost effectiveness is strength and stiffness (1.0) divided by the total component weight divided by the total procurement cost, or: $E = (S/W)/\$$

| Cost Effectiveness | Existing Concept | Disclosed Concept |
|---|---|---|
| No. 1 unit | $6.89 \times 10^{-8}$ | $13.4 \times 10^{-8}$ |
| No. 5 unit | $17.30 \times 10^{-8}$ | $32.5 \times 10^{-8}$ |
| No. 100 unit | $72.00 \times 10^{-8}$ | $162.8 \times 10^{-8}$ |
| No. 500 unit | $142.00 \times 10^{-8}$ | $332.0 \times 10^{-8}$ |

The higher the cost effectiveness value the more effective the concept; as can be seen by the lower cost and weight divided into strength and striffness.

| % Increase Cost Effectiveness from Existing Concept | Existing Concept | Disclosed Concept |
|---|---|---|
| No. 1 unit | 100% | 194.5% |
| No. 5 unit | 100% | 187.8% |
| No. 100 unit | 100% | 226.0% |
| No. 500 unit | 100% | 234.0% |

Figure 17:
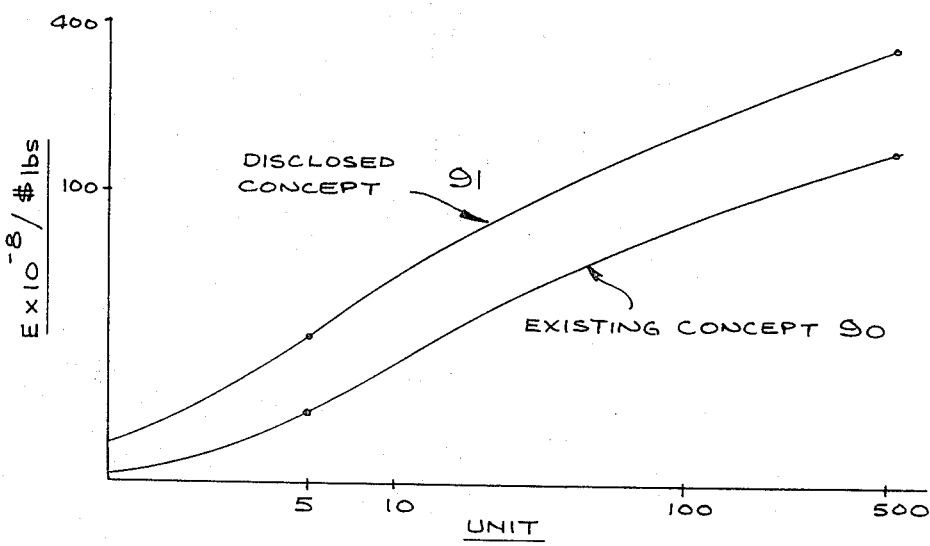
FIG. 17 is a graph showing the cost effectiveness of the present invention compared to existing fabrication techniques.

A plot of cost effectiveness comparing the existing concept 90 and the disclosed concept 91 is illustrated in FIG. 17.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an integral structure adapted to bear applied loads in accordance with predetermined load distribution, the improvement which comprises:
   said integral structure formed from a pair of matching and joined sections;
   each of said sections having integral transverse ribs and frames and longitudinal beams;
   each of said sections further having a shell composed of laminated fibrous material;
   said ribs frames and beams comprising a mandrel of cellular foam composition covered with a laminate of fibrous material bonded to said first mentioned fibrous material so as to retain and secure said ribs, frames and beams thereon; and
   selected ones of said ribs, frames and beams having flat areas intended to matingly engage when said pair of sections are aligned and joined.

2. The invention as defined in claim 1 including attachment means integrally secured along selected edge regions of said sections in communication with said laminated fibrous material whereby said attachment means is supported for load handling purposes.

3. The invention as defined in claim 2 wherein:
   said attachment means includes a plurality of parallel plates in integral supporting relationship with said fibrous material.

4. The invention as defined in claim 1 wherein said outer skin is composed of fibrous material.

5. The invention as defined in claim 1 wherein said fibrous material is composed of selectively oriented fibers that cross or lay parallel to each other in different planes within said laminate.

6. The invention as defined in claim 1 including tension fasteners interconnecting said pair of sections so as to produce an integral monolithic construction.

7. The invention as defined in claim 1 including attachment means securing said pair of matching sections together;
   said attachment means including a plurality of flanged bushings wherein the flanges on opposite ends of a shank engage against the exterior surfaces of said integral structure.

* * * * *